A. C. WRIGHT AND W. DUKES.
ROAD VEHICLE WHEEL.
APPLICATION FILED NOV. 13, 1918.
1,303,139.
Patented May 6, 1919.
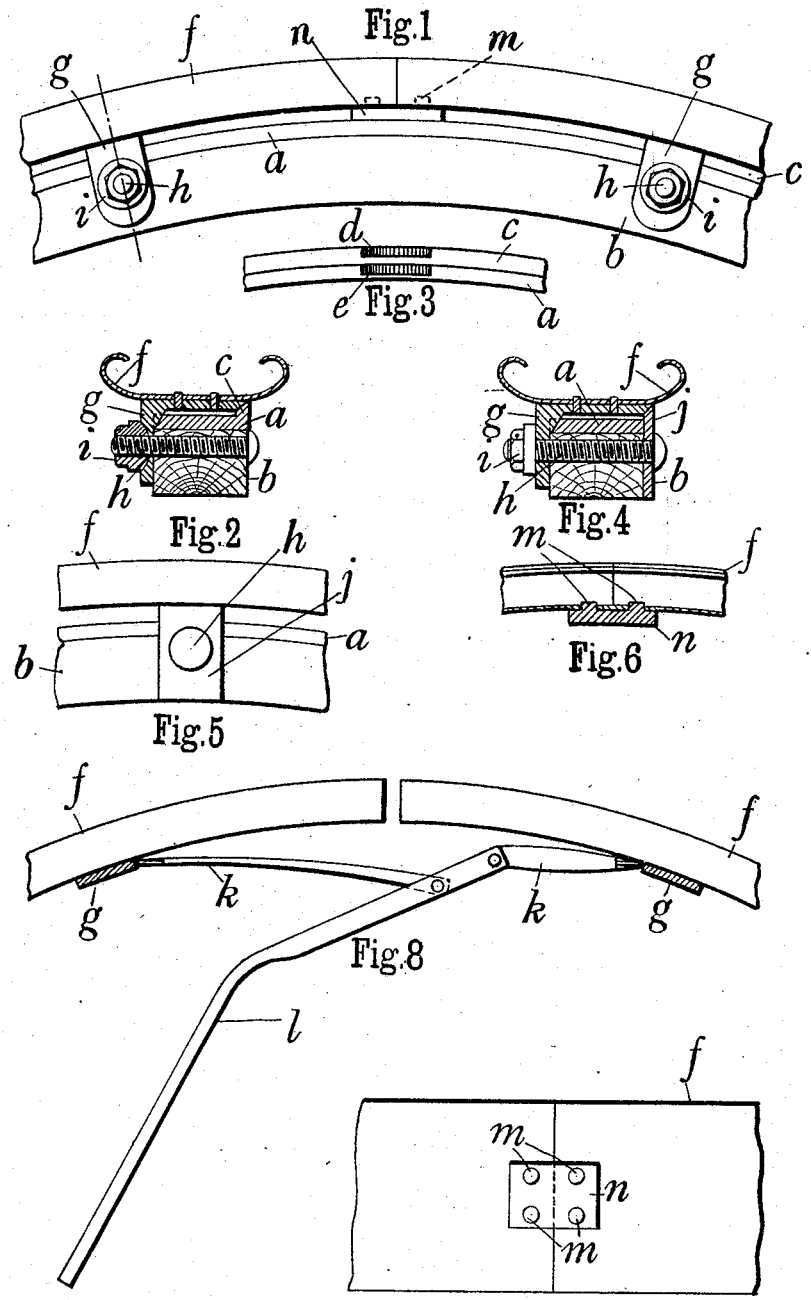
Inventors
A. C. Wright.
W. Dukes.
By H. R. Kerslake
Atty.

UNITED STATES PATENT OFFICE.

ALFRED CECIL WRIGHT AND WILLIAM DUKES, OF BIRMINGHAM, ENGLAND, ASSIGNORS TO THE WARLAND DUAL RIM COMPANY, LIMITED, OF ASTON, BIRMINGHAM, ENGLAND.

ROAD-VEHICLE WHEEL.

1,303,139.     Specification of Letters Patent.    Patented May 6, 1919.

Application filed November 13, 1918. Serial No. 262,309.

*To all whom it may concern:*

Be it known that we, ALFRED CECIL WRIGHT, director, and WILLIAM DUKES, manager, residing at York Mills, Witton Lane, Aston, in the city of Birmingham, England, subjects of the King of Great Britain and Ireland, have invented certain new and useful Improvements Relating to Road-Vehicle Wheels, of which the following is a specification.

This invention relates to road vehicle wheels fitted with detachable rims carrying pneumatic tires, the object of the invention being to provide an improved wheel in which simplicity, convenience and security are combined with relatively low manufacturing cost.

The invention comprises the combination of a bonding ring secured to or forming the outer periphery of the felly and having an outwardly projecting flange around one edge or a number of outward projections at intervals around its periphery, the said ring and flange or projections being shaped to provide tapered seatings at intervals around the ring, a detachable tire rim having around its inner periphery a number of seating pieces, each seating piece being provided with a pair of tapered portions for coacting with a pair of the aforesaid seatings, and an inwardly projecting flange at one end of each of the seating pieces for the reception of fastening bolts on the felly.

In the accompanying sheet of explanatory drawings:—

Figure 1 is a side elevation of a portion of a wheel constructed in accordance with this invention and Fig. 2 is a transverse section of the same through one of the rim seating pieces.

Fig. 3 is a side elevation showing a notched portion of the bonding ring.

Fig. 4 is a transverse section and Fig. 5 a rear elevation showing a modified construction of bonding ring.

Fig. 6 shows in section a side elevation of a device for securing together the ends of the detachable rim, and Fig. 7 is an inverted plan of the same.

Fig. 8 illustrates a toggle lever mechanism for expanding the rim.

In carrying the invention into effect as shown, a metal bonding ring $a$ is secured to the outer periphery of a wood felly $b$. The ring $a$ has a narrow outwardly projecting flange $c$ formed around one edge. One function of the flange is to so stiffen the bonding ring that it can permanently retain its truly circular form under all conditions likely to be met with in service. At intervals the flange is notched as indicated by $d$ (Fig. 3) to form a number of tapered grooves each inclined from the outer edge of the flange to the main part of the bonding ring. Likewise the opposite edge of the bonding ring is notched as indicated by $e$ (Fig. 3), the inclination being in the same direction as that of the flange notches.

The detachable rim $f$ is of the ordinary grooved or flanged section for engaging the beaded edges of the pneumatic tire, and internally is rather larger in diameter than the outside of the bonding ring. Around the inner periphery of the detachable rim a number of seating pieces $g$ are secured. These are of a width which permits them to drop into the notches $d$, $e$, above mentioned. One end of each seating piece is tapered to coact with the inclined seating $d$ in the bonding ring flange, and the other is tapered to coact with the opposite inclined part $e$ of the bonding ring. This is clearly shown in Fig. 2. At the latter end of the seating piece an inwardly projecting flange is formed with a hole through it to pass over a bolt $h$ passing laterally through the felly.

When the detachable rim is mounted on the bonding ring the seating pieces engage the notches in the bonding ring, and the interaction of the inclined parts centrally locates the rim in position. Also the engagement of the seating pieces with the notches prevents relative circumferential movement of the rim. The rim is secured by nuts $i$ screwed on the bolts.

Instead of forming a flange continuously around the bonding ring projections may be provided at intervals to coact with the seating pieces. One convenient way of arranging these projections is to notch one edge or side of the bonding ring and felly at intervals and let into the same plates $j$ which are held in position by the bolts $h$. At their outer ends the plates are tapered to provide seatings for the rim pieces. This construction is shown at Figs. 4 and 5.

To facilitate removal and replacement of the tire on the rim $f$, the latter is divided transversely as shown, so that one end can be sprung over or under the other. With the ends overlapping the tire can easily be taken off or replaced.

To enable the ends to be returned to their proper position in abutment after a tire has been mounted on the rim, we provide an expanding tool comprising a pair of arms $k$ adapted to abut against a pair of the aforesaid seating pieces $g$ on the opposite sides of the rim division, the said arms being connected with an operating lever $l$ to form a toggle system. When the outer ends of the arms are placed against the said pair of seating pieces, the rim is expanded and its ends brought into abutment with one movement of the operating lever. To cause the ends to overlap the toggle lever is first put in position and the rim ends slightly separated by the action of the lever. Another lever such as an ordinary tire lever is then put between the ends and moved in the direction for springing the ends out of alinement, so that on releasing the toggle lever the one end of the rim can slide beneath the other. The levers above described form no part of the present invention.

To connect the rim ends when in the normal position holes are provided near the abutting edges for the reception of pegs $m$ on a plate $n$ which is placed on the under or inner side of the rim as shown in Figs. 6 and 7.

Having thus described our invention what we claim as new and desire to secure by Letters Patent is:—

1. In road vehicle wheels, the combination comprising a bonding ring, tapered seatings at intervals around both external edges of the said ring, a detachable tire rim, seating pieces at intervals around the inner periphery of said rim, each seating piece being provided with a pair of tapered portions for coacting with a pair of tapered seatings on the bonding ring, an inwardly projecting flange on one end of each seating piece, and a fastening bolt engaging said flange, substantially as described.

2. In road vehicle wheels, the combination comprising a bonding ring, projecting tapered seatings around one of the outer edges of said ring, similarly inclined seatings recessed at intervals around the opposite outer edge of said ring, a detachable tire rim, seating pieces at intervals around the inner periphery of said rim, each seating piece being provided with a pair of tapered portions for coacting with a pair of tapered seatings on the bonding ring, an inwardly projecting flange on one end of each seating piece, and a fastening bolt engaging said flange, substantially as described.

In testimony whereof we have signed our names to this specification.

ALFRED CECIL WRIGHT.
WILLIAM DUKES.

Copies of this patent may be obtained for five cents each, by addressing the "Commissioner of Patents, Washington, D. C."